March 15, 1949. F. A. FIRESTONE Re. 23,090
RESONANCE INSPECTION METHOD
Original Filed Nov. 20, 1943
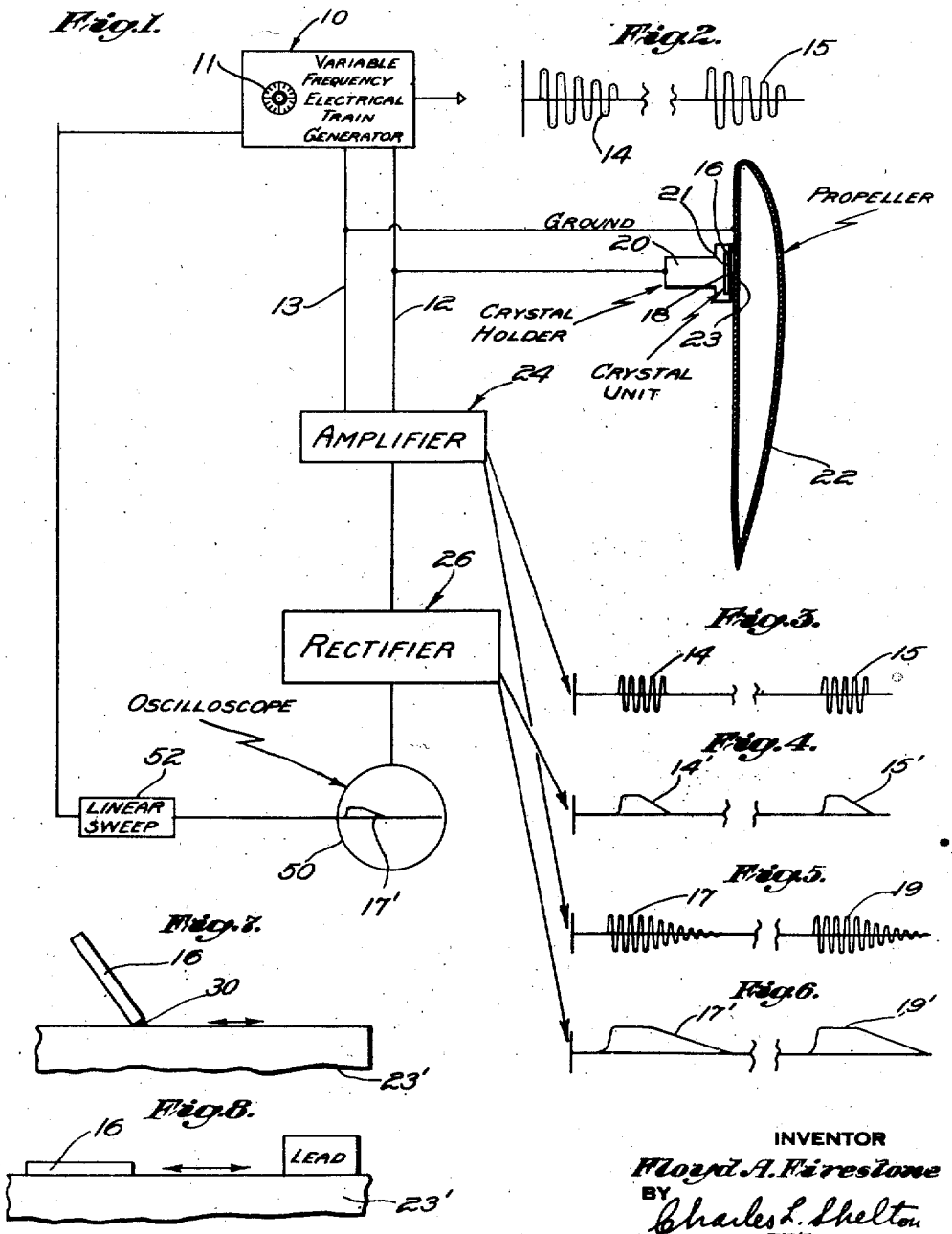
INVENTOR
Floyd A. Firestone
BY
Charles L. Shelton
Attorney Reissued Mar. 15, 1949

Re. 23,090

UNITED STATES PATENT OFFICE 23,090

RESONANCE INSPECTION METHOD

Floyd A. Firestone, Washington, D. C., assignor to United Aircraft Corporation, East Hartford, Conn., a corporation of Delaware Original No. 2,439,131, dated April 6, 1948, Serial No. 511,090, November 20, 1943. Application for reissue October 18, 1948, Serial No. 55,161

25 Claims. (Cl. 73—67)

This invention relates to a method utilizing vibration waves for inspecting and measuring materials.

An object of this invention is to provide an improved method for indicating the characteristics of a material by determining a natural or resonant frequency, or frequencies, thereof.

A further object is to determine elastic aeolotropy in a material by a natural or resonant frequency method.

Other objects and advantages will be apparent from the specification and claims, and from the accompanying drawing which illustrates what is now considered to be a preferred embodiment of the invention.

In the drawing,

Fig. 1 is a block diagram of a supersonic wave train apparatus which may be used in carrying out the method of this invention.

Fig. 2 is a schematic view of a series of voltage trains of a type which may be produced by the generator of Fig. 1.

Figs. 3 and 4 are schematic views of electrical wave trains from the train generator which are of a non-resonant frequency relative to the part being tested, after the trains have passed through the amplifier and rectifier, respectively.

Figs. 5 and 6 are views, respectively similar to Figs. 3 and 4, of amplified and rectified resonant voltage trains from the train generator and the crystal 16.

Figs. 7 and 8 are schematic views of surface wave generating and reflecting means, respectively.

Referring to the drawing, Fig. 1 shows in schematic form a supersonic reflectoscope which may be constructed according to the teaching of my Patent No. 2,280,226, dated April 21, 1942, my Patent No. 2,398,701, dated April 16, 1946, my copending application 471,173, filed January 2, 1943, which is now abandoned and my application entitled: Surface and shear wave method and apparatus, Serial No. 511,089, filed concurrently herewith, said reflectoscope being shown as arranged to measure the thickness of the metal wall portion 23, of an aeronautical propeller blade 22 by the method of the present invention.

A variable frequency voltage train generator 10 having a frequency varying means and frequency indicator 11 is connected to apply voltage trains, such as indicated at 14 and 15 (Fig. 2), and the frequency of which may be varied by turning dial 11, across an electro-mechanical transducer 16, in this instance a piezo-electric crystal, preferably of quartz. Crystal 16 is held in a holder 20, and may be provided with a conductive coating 21 on one or both sides and with a damping means 18 of a material and size sufficient to wholly or partially inhibit free vibration of the crystal at its natural or resonant frequency. A single sending and receiving crystal as shown in the embodiment of the drawing has many advantages, and is well adapted in location to receive reflections or reverberations of the waves it has sent out. However, separate sending and receiving crystals may be used; for instance, separate sending and receiving crystals might be arranged side by side, or respectively applied to opposite sides of the wall portion to be measured or tested.

The face dimensions of the crystal are preferably large in comparison with the thickness of the crystal and the thickness of the plate, and the natural frequency of the crystal is preferably higher than the train frequency required to produce a low order of resonance between the faces of the plate to be measured; however, the crystal frequency is not critical.

In a resonance inspection method, certain advantages follow from making the face dimensions of the crystal large in comparison with the thickness of the crystal and the thickness of the plate as specified above. The waves will then be radiated through the plate in a beam of cross-section approximately equal to the crystal face area, and this may be a beam of longitudinal waves, or a beam of shear waves as described or referred to elsewhere herein. Confining the waves to a beam has the advantages that the resonances are sharp, the relationship between the resonant frequency of the plate and the thickness of the plate is to a close approximation the simple formula given below, and the thickness readings are not appreciably influenced by the thickness of portions of the plate which do not lie beneath the crystal face. The advantage of having a crystal frequency higher than the frequency required to produce a low order of resonance in the plate is that this permits thickness determination by using the lowest resonant mode or a low resonant mode, without the possibility of confusing a resonance frequency of the crystal for a resonance frequency of the plate, as explained more fully below.

In the arrangement shown, one lead 12 from the train generator is electrically connected to the conductive coating 18 on the left face of the crystal and another train generator lead 13 is grounded to the metal to be measured or tested.

Thus, the voltage between the train generator leads is applied across the crystal when the crystal is placed on the grounded metal, and the crystal will be vibrated at the frequency of the voltage trains, by the changing potential of the voltage trains, to cause supersonic waves to be created in the metal. The potential created by train generator 10 may also be applied across the transducer 16 in other ways, for instance by directly connecting the train generator leads to thin metal coatings on opposite faces of the crystal 16. The crystal vibrations or movement may be transmitted indirectly to the part being tested, for instance through a layer of oil or a hardened cement, rather than directly as shown. It is believed preferable in measuring thickness to use an X-cut quartz crystal with an oil film between the crystal and the surface of the piece to be measured. Such an arrangement when a YZ face is placed in effective contact with the work and an oscillating potential is applied to the two YZ faces, generates longitudinal waves. However, a Y-cut crystal energized between the two XZ faces and having an XZ face attached with either an oil film or a hardened cement to the surface of the piece, and generating respectively either surface waves or shear waves, may also be used in inspecting or measuring by the resonance method. If an oil film of low viscosity is used then mainly surface waves will be generated, while an oil film of high viscosity will, like a hardened cement, generate mainly shear waves, as disclosed and claimed in my applications Serial No. 471,173, filed January 2, 1943, which is now abandoned, and Serial No. 511,089, specifically noted above.

Both the original voltage trains from the generator 10 and electrical voltage trains caused by vibrations of the crystal 16 are impressed on an amplifier 24, and after amplification are applied to the oscilloscope 50. Rectifier 26 may be provided in the circuit and has the advantage of providing a more easily read trace on the oscilloscope screen. Fig. 4 indicates, schematically, rectified trains 14', 15'. A linear sweep device 52 for the oscilloscope is connected with the generator 10 to provide a desired time relationship between the initiation of the voltage trains of the generator and the initiation of each sweep of the oscilloscope beam by the linear sweep device.

As is disclosed and claimed in my Patent No. 2,280,226, dated April 21, 1942, and my patent No. 2,398,701, dated April 16, 1946, the voltage train generator 10 may be constructed and adjusted to produce a series of electrical voltage trains, or pulses which have only a definite limited number of oscillations. The trains, each having a selected number of cycles, are sent out by the generator at small intervals, for instance about sixty times a second, and will be seen as a fairly steady trace on the oscilloscope screen because of the "persistence of vision" of the human eye, which effect may be aided by the use of a fluorescent material which has a "persistence of radiation" on the oscilloscope screen. Each train is comprised of only a few cycles and thus each wave train is so "short" as to leave a considerable portion of the one-sixtieth second interval between wave trains as a rest or quiescent period in which the oscilloscope trace is not affected by the generator 10.

For instance, the train generator 10 may be arranged, in practicing the method of this invention, to produce voltage trains of various selected frequencies within the range from about 0.1 megacycle to about 30 megacycles, with each train comprising only a few oscillations and successive trains being spaced at intervals of about one-sixtieth of a second.

In using the method of this invention to measure the thickness of a plate, such as at 23, Fig. 1, a voltage train of sufficient time duration to generate from five to fifty supersonic waves in the plate may be used; in any case the time duration of the voltage train should exceed the time of round trip flight of the waves through the plate, so that a resonant condition may be established as described below. The frequency of the train is varied by turning the tuning knob 11 until a resonant condition is established within the thickness of the plate. Neglecting second order effects, this resonant condition will exist whenever the half wave length of the radiated waves is equal to the thickness of the plate divided by an integer. Thus, if the plate is of such thickness that two megacycle waves have a half wave length just equal to the thickness of the plate, then four, six and eight megacycles, etc., will also produce resonant conditions wherein the thickness of the plate will represent two, three, and four half wave lengths, etc. When the resonant condition is established, a large amount of vibratory energy is stored in the plate in the form of supersonic waves being continuously reflected back and forth between the opposed faces of that portion 23 of the plate lying beneath the crystal 16. When the impressed voltage train from generator 10 is terminated, the waves in the plate continue to reverberate back and forth for a sufficiently long time that they may actually travel through the plate one hundred or two hundred times, at approximately the frequency of the original resonance exciting wave train, while still being of observable amplitude. The presence of this reverberation or resonant vibration may be detected by observing on the oscilloscope of the reflectoscope the voltage which is generated in the crystal due to vibrations thereof caused by the successive impingement of the supersonic waves in the plate against the crystal. Fig. 5 shows the effect of the relatively large magnitude plate vibrations at plate resonance. The voltage train, after amplification, appears as of increased length because the continuing plate vibrations cause potential variations across the crystal after the resonance exciting voltage train is cut-off. Fig. 6 shows the oscillations of Fig. 5 after passing through rectifier 26.

The thickness of a plate, which like portion 23 may have an inaccessible side, may be measured with the reflectoscope apparatus of my prior patent and applications referred to above, by holding a crystal capable of sending supersonic waves against the oiled surface of the plate and turning the tuning knob 11 while watching the trace on the oscilloscope screen. When the plate is not being excited at a resonant frequency, only the original voltage trains will be observed (Figs. 3 and 4), but when the resonant condition is attained, a long tail (Figs. 5 and 6) will appear as a continuation of the original voltage trains and lasting perhaps one hundred or two hundred micro-seconds. The appearance of this reverberant tail is quite a critical phenomenon and quite sharply indicates the establishment of the resonant condition. The frequency at which the tail appears may be determined by a frequency meter connected with the train generator, or the dial 11 may be marked to directly indicate the frequency of the wave trains sent out by the train generator. The velocity of the wave in the particular metal or other material being tested may, of course, be determined either experimentally or mathematically. The thickness of the plate may be computed from $$d=\frac{nv}{2f}$$

where $n$ is an integer equal to the mode of vibration, $f$ is the corresponding resonant frequency, and $v$ is the velocity of propagation. The dial 11 can also be graduated to read thickness directly, the best method of establishing its calibration being to first test a series of specimen plates of different known thicknesses and then to mark such thicknesses directly on the dial at the point at which the respective plates resonate.

Such a calibration in its simplest form is valid only provided that the lowest resonant mode or the second or the third or the $n$th mode is excited in all the reference samples. In other words, for such a calibration to be accurate, it would be necessary to excite the same mode of vibration in both the reference specimens and each of the parts to be tested. There might be confusion and possibility of error if a mode of vibration were excited in a part being measured different than the mode of vibration excited in the respective reference plate on which the calibration was based. There is least possibility of ambiguity if the frequency of operation is so chosen that all the pieces tested or all portions of the piece tested are measured in the lowest mode, since the next mode higher is at a factor of two greater frequency and such a larger error would not pass unnoticed. If there is uncertainty as to the mode, a number of resonant frequencies can be observed and extrapolation made to the lowest mode.

Where all the parts to be inspected or measured are of approximately the same thickness, as would usually be the case in commercial inspection, and are excited in their lowest or the second mode of resonant vibration, there will be little or no ambiguity and the dial can be calibrated to read directly in thickness, which considerably speeds up the inspection process. It has been found that in such commercial testing readings may easily and consistently be made, in the manner described in this application, to less than .001 inch when measuring a thickness of the order of .040 inch, only a few seconds being required to measure thickness at any one point.

As it is necessary to operate the quartz crystal 16 over a considerable range of frequencies, it is desirable that a considerable amount of damping be attached to the crystal, which may be in the form of a block 18 cemented to the crystal back or to a conductive coating on the crystal back. The block is preferably composed of a material, such as a synthetic resin formed by the condensation of phenols and formaldehyde, which does not transmit these waves well so no trouble is encountered from reflections from the opposite face of the block. This enables operation from slightly above the natural or resonant crystal frequency down to one-half or one-third of crystal frequency, without the likelihood of errors or confusion such as might be caused where a resonant frequency of the crystal itself was within the range of frequencies over which the train generator is varied in the course of a measurement. Since such a highly damped crystal system is inherently insensitive, the reflectoscope amplifier 24 should have a high amplification in order to sufficiently increase the potential variations created across the crystal 16 by vibrations thereof caused by the supersonic waves existing in the wall portion 23 at the resonant condition, so that such variations in potential may be clearly seen on the screen of oscilloscope 50.

The wave train method of the present invention is extremely sensitive and at the same time accurate and consistent because the original voltage train is shut off when the continuing reflections at resonance in the immediately following period or interval cause potential variations across the crystal which are applied to amplifier 24. This justifies the use of an amplifier 24 which is sensitive to .0002 volt, with a train generator capable of initially energizing the crystal with five hundred volts. The amplifier merely overloads when the initial five hundred volt train is applied thereto. After the exciting train passes, the circuit is clear and the amplifier 24 is in condition for picking up and amplifying extremely small voltages (down to .0002 volt) such as would result from vibratory motion of the crystal 16 caused by supersonic wave reverberations between the faces of the plate portion 23, if the original voltage train happened to be of a frequency which would excite a natural or resonant vibration in the plate portion 23. This method, utilizing wave trains, thus has an essential advantage over methods involving the use of steady state vibrations or continuous waves, as distinguished from wave trains. From a technical standpoint, any method of continuously exciting and measuring supersonic resonance encounters the difficulty of unavoidable electrostatic coupling between the exciting and measuring systems; this may be minimized, but not eliminated, by electrostatic shielding, with the result that such continuous methods are limited in sensitivity and border on inoperability.

The statement made above concerning the thickness of the plate being an integral number of half wave lengths is not always exact in view of the fact that the presence of the crystal against one face of the plate may somewhat modify the frequency at which it resonates. While this effect can be taken into account theoretically, the most practical method is to calibrate each crystal by measuring a series of specimen plates of known thickness and calibrating the tuning dial thereby. As long as a single crystal is used, the results are quite consistent.

If the plate to be tested has a curved surface, consistent results can still be obtained, though in this case greatest sensitivity is provided if the crystal is ground to fit the surface of the plate.

Instead of cutting off the voltage train abruptly, as is particularly described in my Patent No. 2,398,701, dated April 16, 1946, the train may be allowed to have a long exponentially decaying tail, which tail will then interfere, constructively or destructively, with the voltage variations created across the crystal by the free and forced vibrations of the plate at resonance. In this case resonance is determined by watching the end of the tail as the generator is tuned and noting a rapid fluctuation of the tail amplitude which will occur in the neighborhood of resonance in the plate as the frequency of the original train is slightly varied.

The above described method refers principally to longitudinal supersonic waves, but it is also possible to utilize shear waves or surface waves and obtain resonance in a similar manner. In order to generate shear waves in a material, a Y-cut crystal is cemented to the surface of the material, or attached with a film of highly viscous oil, and energized with the reflectoscope in the usual manner, as disclosed and claimed in my application Serial No. 511,089, specifically noted above. Unlike longitudinal waves, shear waves vibrate in a direction at right angles to the direction of propagation, the plane of vibration lying in the X-direction of the radiating quartz crystal. For instance, if a metal plate is lying horizontally, shear waves can be sent downwardly through it by cementing a Y-cut crystal to its top face; the Y-axis of the crystal will then be vertical and the X-axis may be north-south while the Z-axis is east-west. An alternating potential from the wave train generator may be applied across the two XZ-faces in a manner similar to that described for the crystal in Fig. 1. Shear waves will then be radiated downwardly through the plate in a beam of cross-section approximately equal to the crystal face area, and the plane of vibration will be north-south. If the crystal is detached and again cemented to the material with its X-axis east-west, and energized in a similar manner, the plane of vibration of the resulting shear waves will be east-west. If a Y-cut quartz crystal is affixed to the material through a film of oil of low viscosity, then surface waves will be generated, as described in my application Serial No. 471,173, filed January 2, 1943, which is now abandoned, and Serial No. 511,089. A resonance condition with surface waves may also be established along the surface of a material between a surface wave generating crystal and a reflecting edge on said material.

Figs. 7 and 8 show an arrangement for establishing a resonance condition with surface waves, respectively between a Y-cut surface wave generating crystal 16 and an end of material 23′ or between the crystal and a reflecting edge formed by placing a heavy block on the surface of the piece. Numeral 30 in Fig. 7 indicates an oil film.

Thus, the invention includes a method of utilizing longitudinal, surface, and shear waves under controlled conditions so as to be able to accurately observe their time of propagation through very short distances such as a small fraction of an inch (the order of vibration divided by twice the resonance frequency gives the time required for the wave to travel the distance between the faces of the plate), to the end that either the distance between the faces of the material, or the velocity of the wave therethrough may be determined and, in turn, any properties of the material which depend upon or influence the velocity.

If the velocity of propagation of the supersonic waves through the material be known, the thickness of the plate may be determined as described above even though one face thereof might be inaccessible. Conversely, if the dimensions of the plate can be measured, for instance, by the use of a micrometer, or is otherwise known, then the method of determining resonance frequencies described above could be used to find the velocity of wave propagation.

Many solid materials, notably crystals, rolled and forged metals, and aeolotropic substances generally, have different velocities of propagation for supersonic waves whose directions of propagation or vibration planes are in different directions. In an aeolotropic material, the velocities of longitudinal and surface waves depend only on the direction of wave propagation in a given sample of material, while the velocity of shear waves depends on two factors which are capable of being independently chosen; namely, the direction of wave propagation and the alignment or orientation of the plane of vibration of the wave relative to the material. Thus, the presence or absence of aeolotropy in a material and its magnitude may be indicated and measured by propagating supersonic waves having respectively different directions of propagation or orientation of their planes of vibration. For instance, if the material in question is aeolotropic and has principal elastic axes east-west and north-south, then it will possess different velocities of propagation for the shear wave crystal mounted with its X-axis north-south than when it is mounted with the X-axis east-west. The difference in velocity of propagation will be evidenced by different frequencies at which the resonant condition is established. Thus, the difference in the resonant frequencies for the two principal directions of mounting of the crystal and for the same direction of wave propagation may be utilized as an indication and measurement of the amount of elastic aeolotropy. If the crystal is mounted with its X-axis north-east south-west while the elastic axes of the plate are north-south and east-west, the shear waves initiated by the crystal will be divided by the material into two components or sets of shear waves, one with its vibration plane east-west and the other north-south. These two components will travel with different speeds and will thereby give rise to two separate sets of resonant frequencies, indicating different velocities with respect to the two elastic axes, which can be observed thus with a single cementing of the crystal. By the term "cementing" as here used, I refer to a connection or securing means which will transmit shearing stresses, as distinguished from a low viscosity liquid or non-rigid securing medium or means.

Since the two different velocities of shear waves give rise to two separate sets of natural frequencies, a very refined method of measuring the difference between these natural frequencies comprises observing beats between them. The crystal is attached to the work with its X-direction approximately at 45° to the directions of the elastic axes of the work and the pulse frequency is adjusted to be approximately midway between two natural frequencies of the same mode but belonging respectively to the different axes. The exciting frequency is thereby close enough to these natural frequencies that the free vibrations of each of these natural frequencies are excited and are of approximately equal amplitudes. These two frequencies react upon the crystal to produce beats which are evident throughout the long tail as an equally spaced waxing and waning of amplitude. The time equivalent of this beat spacing is measured in the pattern. The percentage by which the lower shear wave velocity is less than the higher shear wave velocity can then be computed as $$\frac{100}{Tf}$$

where $f$ is the higher of the two natural frequencies involved in the beat and T is the time between beats or the period of the beat.

This determination of elastic aeolotropy may be utilized for observing any property of the material which, in turn, results in elastic aeolotropy. For instance, if the plate in question is stressed in tension, which produces elastic aeolotropy, the amount of this tension may be measured by measuring the difference in velocity between the two components of the shear waves sent through it as mentioned above. This method of observation may be used for detecting internal stresses in parts which have not been relieved by annealing, etc. The rolling of the material in a specified direction will produce aeolotropy and hence may be so detected.

It is to be understood that the invention is not limited to the specific embodiments herein illustrated and described, but may be used in other ways without departure from its spirit as defined by the following claims.

I claim:

1. In a method of measuring material having a dimension in the direction to be measured of the order of one-tenth of an inch or less, the steps of; subjecting said material to a plurality of trains of supersonic vibrations having different frequencies, electrically measuring the relative magnitudes of the free vibration of said material in the periods of time immediately following the cessation of each said trains of vibrations, and measuring the frequency at which said free vibration becomes a maximum.

2. In a method of determining a frequency of resonance of a material, the steps of; subjecting a surface of said material to a plurality of trains of mechanical vibrations, said trains having different supersonic frequencies, electrically determining the relative amounts of energy given out from said surface at each of said different frequencies resulting from excitation of said material by said vibration trains, and measuring the frequency at which said energy becomes a maximum.

3. In a method of detecting a resonant condition of vibration in a bounded portion of a material, the steps of; transmitting through said bounded portion a plurality of supersonic vibration wave trains, electrically measuring the relative magnitudes of the free vibration of said part in the intervals following the termination of each of said trains, varying the frequency of the waves in successive trains until a resonant condition is produced in said bounded portion as indicated by a maximum in the free vibration of said part in the intervals following the termination of said trains, and measuring the frequency at which said resonant condition is produced.

4. A method of inspecting solid material comprising, applying a series of damped oscillatory voltage trains to a piezoelectric crystal attached to said material, and observing the interference between the voltage generated in said crystal by the vibrations of said material resulting from excitation of said material by said crystal and the applied damped oscillatory voltage.

5. A method of inspecting a solid material, comprising transmitting through a bounded surface portion of said material lying between two reflectors of surface waves a plurality of surface wave trains having different frequencies, and determining a frequency of natural vibration of said material as indicated by a maximum in the free vibration of said bounded portion by measuring the free vibrations of said bounded portion in intervals following the termination of said trains.

6. A method of inspecting a solid material, comprising transmitting through a bounded portion of said material lying between two reflectors of shear waves a plurality of shear wave trains having different frequencies, and determining a frequency of natural vibration of said material as indicated by a maximum in the free vibration of said bounded portion by measuring the free vibrations of said bounded portion in intervals following the termination of said trains.

7. A method of inspecting a solid material, comprising transmitting through a bounded portion of said material lying between two reflectors of longitudinal waves a plurality of longitudinal wave trains having different frequencies, and determining a frequency of natural vibration of said material as indicated by a maximum in the free vibration of said bounded portion by measuring the free vibrations of said bounded portion in intervals following the termination of said trains.

8. In a method of inspecting material for elastic aeolotropy, the steps of; attaching an XZ-face of a Y-cut quartz crystal to a surface of said material, electrically vibrating said crystal to create a train of supersonic shear waves in said material, varying the frequency of said vibration until a condition of resonance is established in said material, and continuing to vary the frequency of said vibration to determine whether or not a second condition of resonance, at the same mode of vibration and a different frequency of said vibration, will be established in said material.

9. In a method of measuring the relative velocities of supersonic shear waves propagated in the same direction but with their planes of vibration along two respectively different elastic axes of a material, the steps of; simultaneously exciting a bounded portion of said material with an electromechanical transducer to free shearing vibrations having planes of vibration respectively along said two elastic axes, and measuring the beat period of said free vibrations.

10. In a method of measuring elastic aeolotropy of a material, the steps of; placing an electromechanical shear transducer in effective mechanical contact with a face of a plate of said material with the direction of the line of vibration of said transducer lying between those planes of vibration giving maximum and minimum velocities of shear waves through said plate respectively, electrically exciting said transducer to create supersonic vibrations in said plate, discontinuing said excitation, and observing the beat period in the voltage across said transducer resulting from free vibrations of said material after said excitation has been discontinued.

11. In a method of measuring the relative velocities of supersonic waves propagated along respectively different elastic axes of a material, the steps of; energizing said material with an electromechanical transducer to cause it to vibrate at least partially in shear at a supersonic natural frequency along each of respectively different elastic axes thereof, and measuring the beat period of said natural vibrations.

12. In a method of inspecting material, the steps of; placing a piezoelectric crystal in effective mechanical contact with a surface portion of said material, electrically exciting said crystal to create supersonic forced vibrations in said material having a definite frequency, discontinuing said excitation, measuring the amplitude of the voltage across said crystal resulting from free vibrations of said material after said excitation has been discontinued, re-exciting said crystal to create supersonic forced vibrations in said material having a frequency different from the frequency of the first named vibrations, discontinuing said re-excitation, measuring the amplitude of the voltage created across said crystal by free vibrations resulting from said re-excitation, and measuring the frequency at which the amplitude of said voltage is a maximum.

13. The method of claim 12, in which separate sending and receiving crystals are provided.

14. In a method of commercial inspection and measurement of elastic material, the steps of; exciting a reference material portion at various supersonic frequencies with a series of vibration wave trains, measuring the amplitudes of the free vibration of said material in the intervals following said wave trains to determine a resonance frequency thereof, similarly vibrating a test material portion to be inspected at said resonance frequency, and electrically measuring and comparing the magnitude of the free vibrations of said test portion being inspected with the magnitude of the free vibrations of said reference portion at said resonant frequency.

15. In a method of inspecting materials, the steps of; placing a quartz crystal in effective mechanical contact with said material, energizing said crystal with an electrical voltage train having an exponentially decaying tail, varying the frequency of said train until a rapid fluctuation occurs in the amplitude of said tail, and determining the frequency of the train at which said fluctuation occurs.

16. A method of observing a resonant condition between two faces of a solid metal part comprising transmitting through the part a plurality of vibration wave trains of different frequencies, each train having a frequency within the range from about 0.1 megacycles to about 30 megacycles, observing the magnitude of the free vibration of the part in the intervals following the termination of the said trains, and measuring the frequency at which said free vibration becomes a maximum.

17. A method of accurately measuring a metal having a dimension in the direction to be measured which is less than one-tenth of an inch, comprising transmitting through the material a number of vibration wave trains having different frequencies within the range from about 0.1 megacycles to about 30 megacycles, each said train having a length of from five to fifty cycles, and measuring the resulting free vibrations of the plate in the intervals following the termination of the said trains to determine the frequency at which resonance is produced as indicated by a maximum in said free vibration.

18. In a method of inspecting material, the steps of; electrically vibrating a portion of said material to propagate a plurality of shear waves in said material which travel in the same direction and have the same frequency but different orientations of planes of vibration relative to each other, and electrically measuring the relative magnitudes of the free vibration of said material in the respective planes of vibration.

19. In a method of inspecting a bounded portion of a material the steps of; placing a transducer in effective mechanical contact with a surface of said bounded portion, electrically energizing said transducer with successive voltage trains to transmit vibration waves into said bounded portion, said voltage trains having individual time durations exceeding the time of round trip flight of said vibration waves through said bounded portion, varying the frequency of the waves in successive voltage trains, and observing in the periods during or following the dimunition of amplitude of said energizing voltage trains changes in the vibration of said bounded portion resulting from said frequency variations.

20. In a method of inspecting a bounded portion of a material for aeolotropy, the steps of, placing a shear wave transducer in effective contact with said bounded portion, electrically exciting said transducer at varying frequencies, said transducer being oriented relative to different elastic axes of said material so as to excite free vibrations in said bounded portion with respect to each of said axes, and electrically determining the relation between the natural frequencies along different elastic axes of said bounded portion.

21. In a resonance method of inspecting a bounded portion of a solid material to determine the thickness thereof, which bounded portion comprises a plate having principal surfaces which are approximately parallel, the steps of: placing a piezo-electric crystal transducer in effective mechanical contact with a principal surface of said bounded portion, electrically energizing said crystal transducer to create a beam of vibration waves traveling in said bounded portion along a line substantially normal to said principal surfaces, maintaining the energization of said crystal transducer for a time exceeding the time of flight of said vibration waves through twice the thickness of said bounded portion to produce a voltage across said crystal transducer due to reflected waves which coexists with the energizing voltage, changing the frequency of said energizing voltage, and determining from a change in the resultant of said voltages a frequency of resonance of said bounded portion.

22. In a resonance method of inspecting a bounded portion of a solid material to determine the thickness thereof, which bounded portion comprises a plate having principal surfaces which are approximately parallel, the steps of: placing a piezo-electric crystal transducer, having face dimensions large in comparison with the thickness of said bounded portion, in effective mechanical contact with a principal surface of said bounded portion, electrically energizing said crystal transducer to create a beam of vibration waves traveling in said bounded portion along a line substantially normal to said principal surfaces, maintaining the energization of said crystal transducer for a time exceeding the time of flight of said vibration waves through twice the thickness of said bounded portion to produce a voltage across said crystal transducer due to reflected waves which coexists with the energizing voltage, changing the frequency of said energizing voltage, and determining from a change in the resultant of said voltages a frequency of resonance of said bounded portion.

23. In a resonance method of inspecting a bounded portion of a solid material to determine the thickness thereof, which bounded portion comprises a plate having principal surfaces which are approximately parallel, the steps of: placing a piezo-electric crystal transducer, having face dimensions large in comparison with the thickness of the crystal and the thickness of said bounded portion, in effective mechanical contact with a principal surface of said bounded portion, electrically energizing said crystal transducer to create a beam of vibration waves traveling in said bounded portion along a line substantially normal to said principal surfaces, maintaining the energization of said crystal transducer for a time exceeding the time of flight of said vibration waves through twice the thickness of said bounded portion to produce a voltage across said crystal transducer due to reflected waves which coexists with the energizing voltage, changing the frequency of said energizing voltage, and determining from a change in the resultant of said voltages a frequency of resonance of said bounded portion.

24. In a resonance method of inspecting a bounded portion of a solid material to determine the thickness thereof, which bounded portion comprises a plate having principal surfaces which are approximately parallel, the steps of: placing a piezo-electric crystal transducer in effective mechanical contact with a principal surface of said bounded portion, said piezo-electric crystal transducer having face dimensions large in comparison with the thickness of the crystal and the thickness of said bounded portion and having a natural frequency higher than the frequency required to produce a low order of resonance between said principal surfaces of said bounded portion, electrically energizing said crystal transducer to create a beam of vibration waves traveling in said bounded portion along a line substantially normal to said principal surfaces, maintaining the energization of said crystal transducer for a time exceeding the time of flight of said vibration waves through twice the thickness of said bounded portion to produce a voltage across said crystal transducer due to reflected waves which coexists with the energizing voltage, changing the frequency of said energizing voltage, and determining from a change in the resultant of said voltages a frequency of resonance of said bounded portion.

25. In a resonance method of inspecting a bounded portion of a solid material to determine the thickness thereof, which bounded portion comprises a plate having principal surfaces which are approximately parallel, the steps of: placing a piezo-electrical crystal transducer in effective mechanical contact with a principal surface of said bounded portion, said piezo-electric crystal transducer having face dimensions large in comparison with the thickness of the crystal and the thickness of said bounded portion and having a block of wave attenuating material in contact with that face of the crystal which is opposite the crystal face in contact with said bounded portion being inspected, electrically energizing said crystal transducer to create a beam of vibration waves traveling in said bounded portion along a line substantially normal to said principal surfaces, maintaining the energization of said crystal transducer for a time exceeding the time of flight of said vibration waves through twice the thickness of said bounded portion to produce a voltage across said crystal transducer due to reflected waves which coexists with the energizing voltage, changing the frequency of said energizing voltage, and determining from a change in the resultant of said voltages a frequency of resonance of said bounded portion.

FLOYD A. FIRESTONE.

No references cited.